(12) United States Patent
Kawashima

(10) Patent No.: US 7,523,801 B2
(45) Date of Patent: Apr. 28, 2009

(54) MOTORCYCLE WITH INCLINATION SENSOR

(75) Inventor: Daihei Kawashima, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 51 days.

(21) Appl. No.: 11/683,332

(22) Filed: Mar. 7, 2007

(65) Prior Publication Data

US 2007/0222575 A1 Sep. 27, 2007

(30) Foreign Application Priority Data

Mar. 8, 2006 (JP) .............................. 2006-062111

(51) Int. Cl.
  *B62D 61/02* (2006.01)
  *B62K 11/00* (2006.01)
  *B60K 28/14* (2006.01)
(52) U.S. Cl. ........................................ 180/219; 180/282
(58) Field of Classification Search .................. 180/219, 180/282, 283
  See application file for complete search history.

(56) References Cited

U.S. PATENT DOCUMENTS 4,641,124 A * 2/1987 Davis ..................... 340/426.23
6,527,077 B2 * 3/2003 Yamamoto et al. .......... 180/283
7,389,592 B2 * 6/2008 Tsuruta et al. ............ 33/366.16
7,416,044 B2 * 8/2008 Tsuruta ....................... 180/282
2002/0027037 A1 * 3/2002 Yamamoto et al. .......... 180/283
2006/0020385 A1 * 1/2006 Kakinuma ................... 701/112
2006/0054375 A1 * 3/2006 Kakinuma ................... 180/282
2006/0218808 A1 * 10/2006 Tsuruta et al. ................ 33/335
2006/0243514 A1 * 11/2006 Oohashi ...................... 180/282
2007/0045028 A1 * 3/2007 Yamamoto et al. .......... 180/282
2007/0051001 A1 * 3/2007 Hasegawa et al. ......... 33/366.24
2008/0150314 A1 * 6/2008 Van Der Westhuizen ... 296/78.1

FOREIGN PATENT DOCUMENTS

| JP | 2002-340553 | 11/2002 |
| JP | 3512392 | 11/2002 |
| JP | 3512392 | 1/2004 |

* cited by examiner

*Primary Examiner*—Paul N Dickson
*Assistant Examiner*—Marc A Scharich
(74) *Attorney, Agent, or Firm*—Knobbe, Martens, Olson & Bear, LLP

(57) ABSTRACT

A motorcycle that preserves the detection accuracy of an inclination sensor without use of a component provided exclusively for protection of the inclination sensor and without the necessity for rigid attachment of the inclination sensor. The motorcycle includes an inclination sensor for detecting a lateral inclination angle of a vehicle body. The inclination sensor is disposed below a component that is removably mounted on the vehicle body.

18 Claims, 9 Drawing Sheets

MOTORCYCLE WITH INCLINATION SENSOR

RELATED APPLICATIONS

This application is related to, and claims priority from, Japanese Patent Application No. 2006-062111, filed Mar. 8, 2006, the entirety of which is hereby incorporated by reference herein and made a part of the present disclosure.

BACKGROUND OF THE INVENTION

1. Field of the Invention

The present invention relates to a motorcycle which includes an inclination sensor for detecting an inclination angle of the vehicle body in the lateral direction.

2. Description of the Related Art

Some types of motorcycle have an engine stop system which stops the engine when a vehicle is inclined to an angle larger than a predetermined inclination angle. According to such an engine stopping system, an inclination sensor detects the inclination angle of the vehicle body and stops fuel supply to the engine when the inclination angle exceeds the predetermined value.

To enhance the detection accuracy for detecting the inclination angle of the vehicle body, the inclination sensor is disposed generally along the lateral center of the vehicle (e.g., the center of the vehicle in the width direction) and positioned substantially horizontally when the vehicle is upright on a level surface. For example, an inclination sensor disclosed in Japanese Publication No. 2002-340553 is attached to the upper surface of a rear wheel mud guard of the vehicle, which is located below a seat of the vehicle.

SUMMARY OF THE INVENTION

An aspect of the present invention involves the realization by the present inventors that, recently, a type of motorcycle which has storage space below an openable seat for use of the storage space has become more prevalent. Since the inclination sensor in this type of motorcycle is provided on the mud guard below the seat (which is frequently opened and closed), the inclination sensor is exposed each time the seat is opened. Thus, the inclination sensor is rigidly attached to the mud guard such that the attachment position is not shifted by interference between an article accommodated within the storage space and the inclination sensor. Alternatively, the interference between the accommodated article and the inclination sensor is prevented by using a component, such as a cover, provided exclusively for protecting the inclination sensor.

Preferred embodiments of the invention solve one or more of the above-mentioned problems. In particular, a motorcycle having certain features, aspects and advantages of the present invention secures sufficient detection accuracy of an inclination sensor without using a component used exclusively for protecting the inclination sensor and without necessity for rigid attachment of the inclination sensor.

An aspect of the present invention involves a motorcycle including a body and a seat supported by the body. An inclination sensor detects an inclination angle of a vehicle body in the vehicle width direction (e.g., a roll sensor). The inclination sensor is disposed below a component which is removably mounted on the body and which performs a function in addition to covering the inclination sensor.

The inclination sensor of the motorcycle described above is disposed below the component removably mounted to the vehicle body such that exposure of the inclination sensor from above is prevented by the component mounted on the vehicle without using additional component provided exclusively for protecting the inclination sensor. Accordingly, the position of the inclination sensor is not shifted by an external force, and therefore the detection accuracy of the inclination sensor is not deteriorated. When it is necessary to remove the inclination sensor for maintenance or other purposes, the inclination sensor can be accessed by removing the component mounted on the vehicle.

In another aspect, the present invention involves a motorcycle including a body and an inclination sensor. The inclination sensor is positioned below a component of the motorcycle and the component is one of a storage box, an air cleaner box and a fuel tank.

BRIEF DESCRIPTION OF THE DRAWINGS

FIG. 8a is a top view of the sensor. FIG. 8b is a rear, cross-sectional view of the sensor taken along the line b-b of FIG. 8a. FIG. 8c is a side, cross-sectional view of the sensor taken along the line c-c of FIG. 8b.

DETAILED DESCRIPTION OF THE PREFERRED EMBODIMENT

Figure 1:
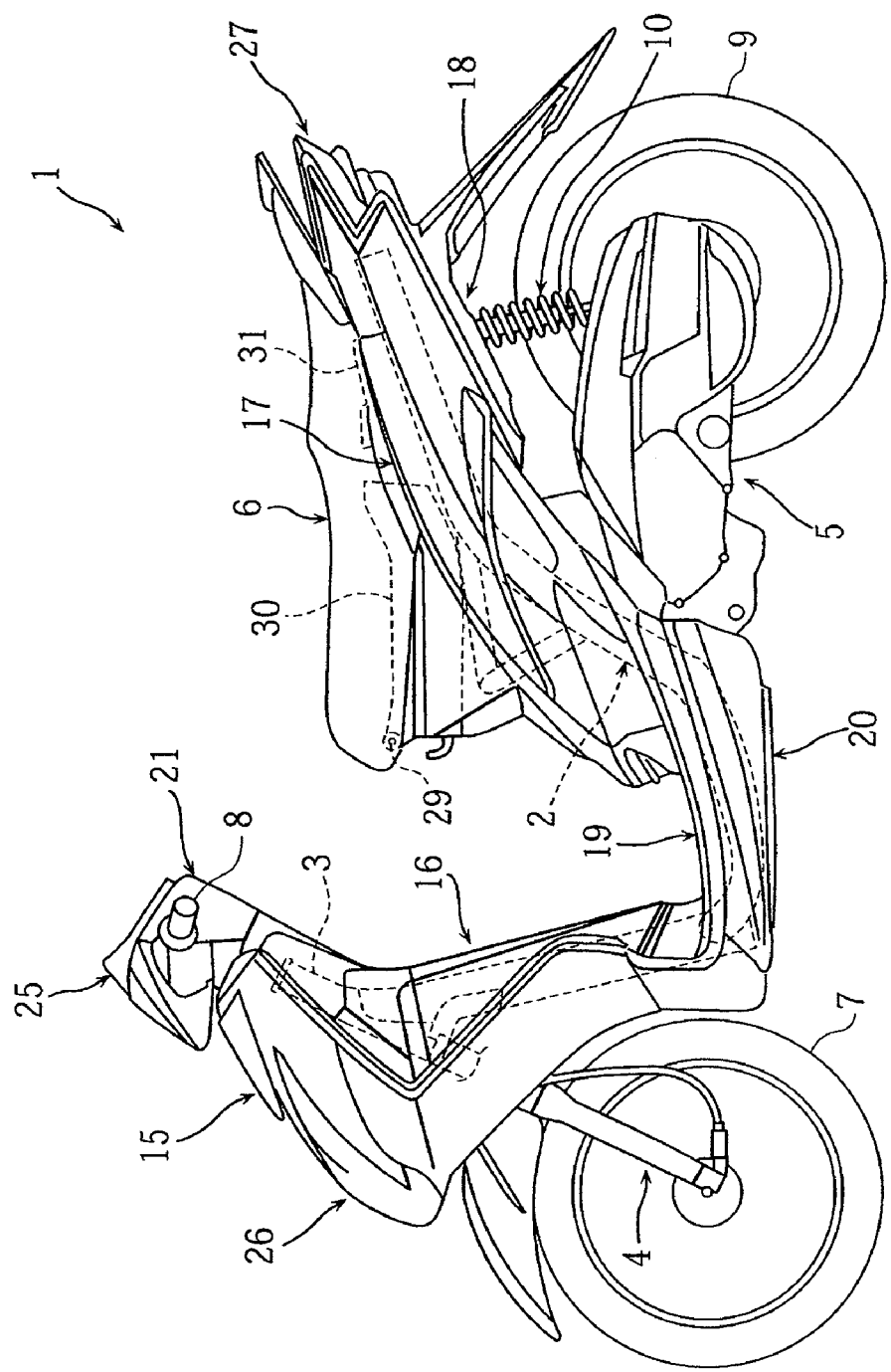
FIG. 1 is a side view of a motorcycle having certain features, aspects and advantages of the present invention. Certain hidden components of the motorcycle are shown in broken line.
Figure 2:
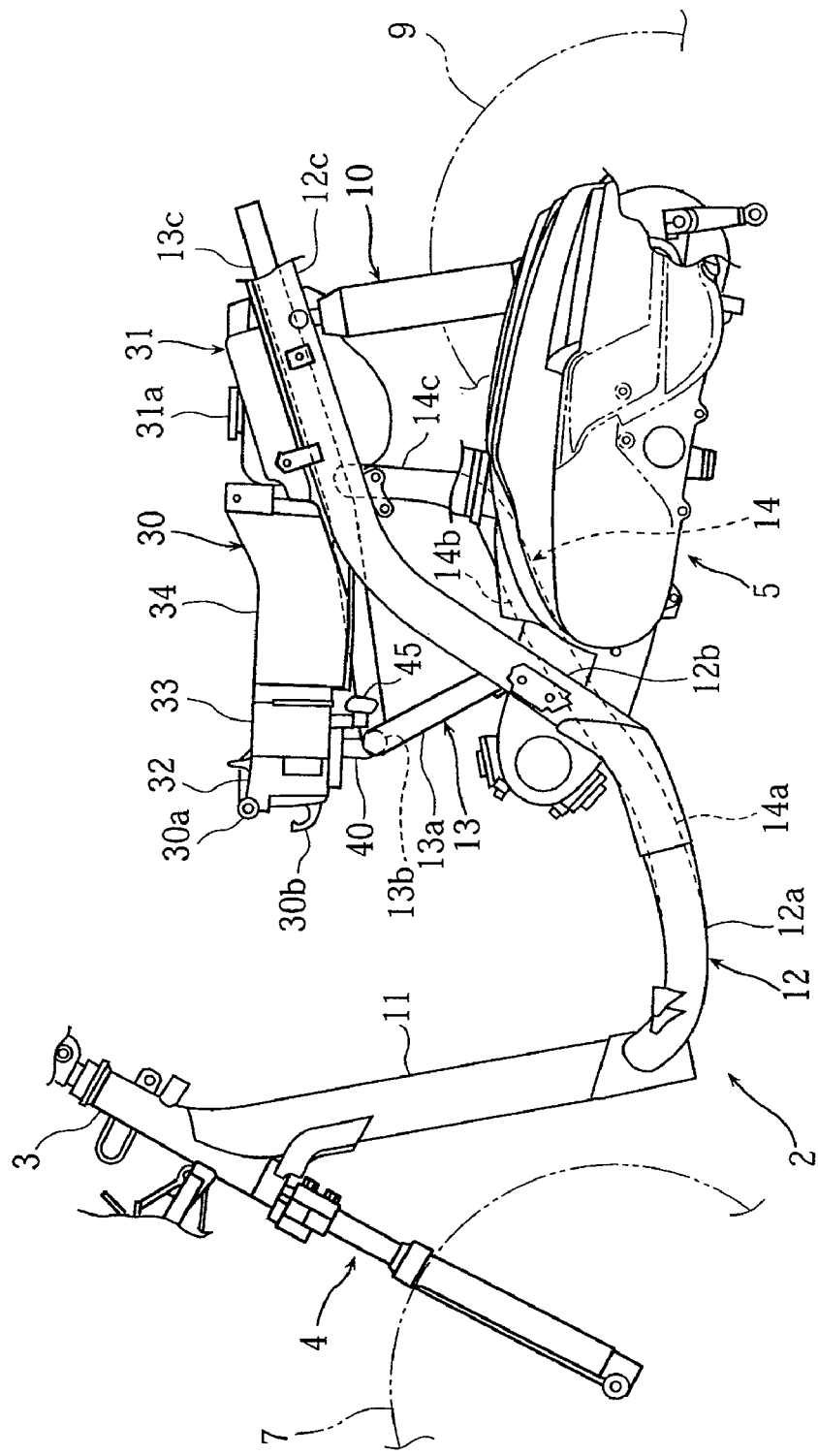
FIG. 2 is a side view of the motorcycle of FIG. 1, with certain components removed to show the frame assembly and other normally hidden components of the motorcycle.
Figure 3:
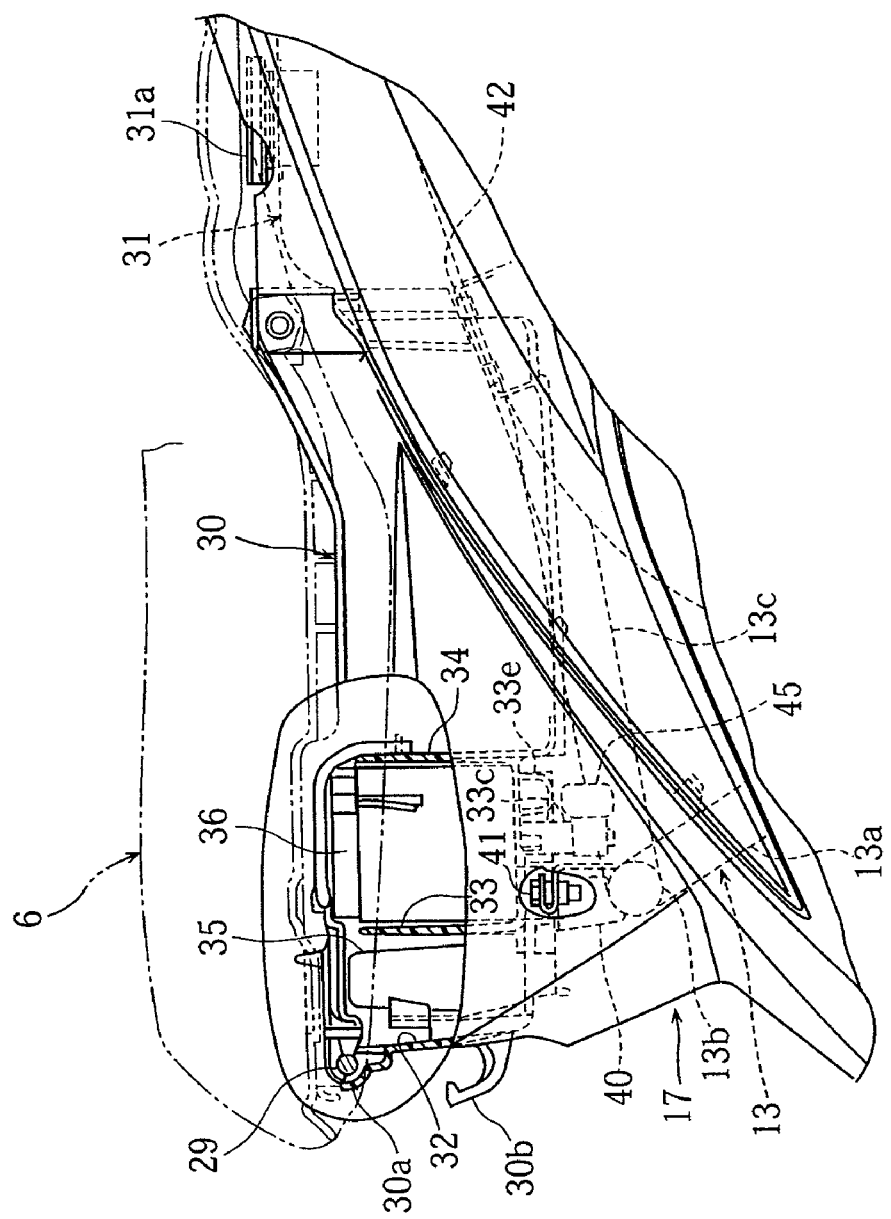
FIG. 3 is a side view of a storage box of the motorcycle of FIG. 1.
Figure 4:
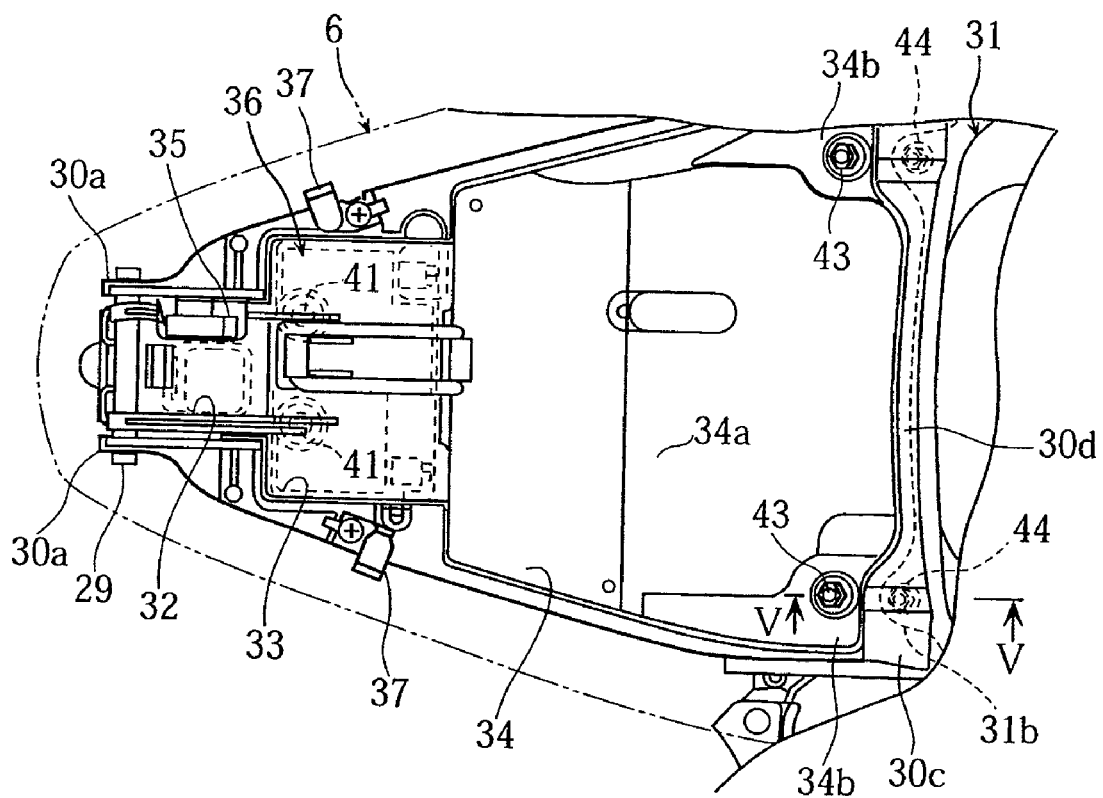
FIG. 4 is a plan view of the storage box of the motorcycle of FIG. 1.
Figure 5:
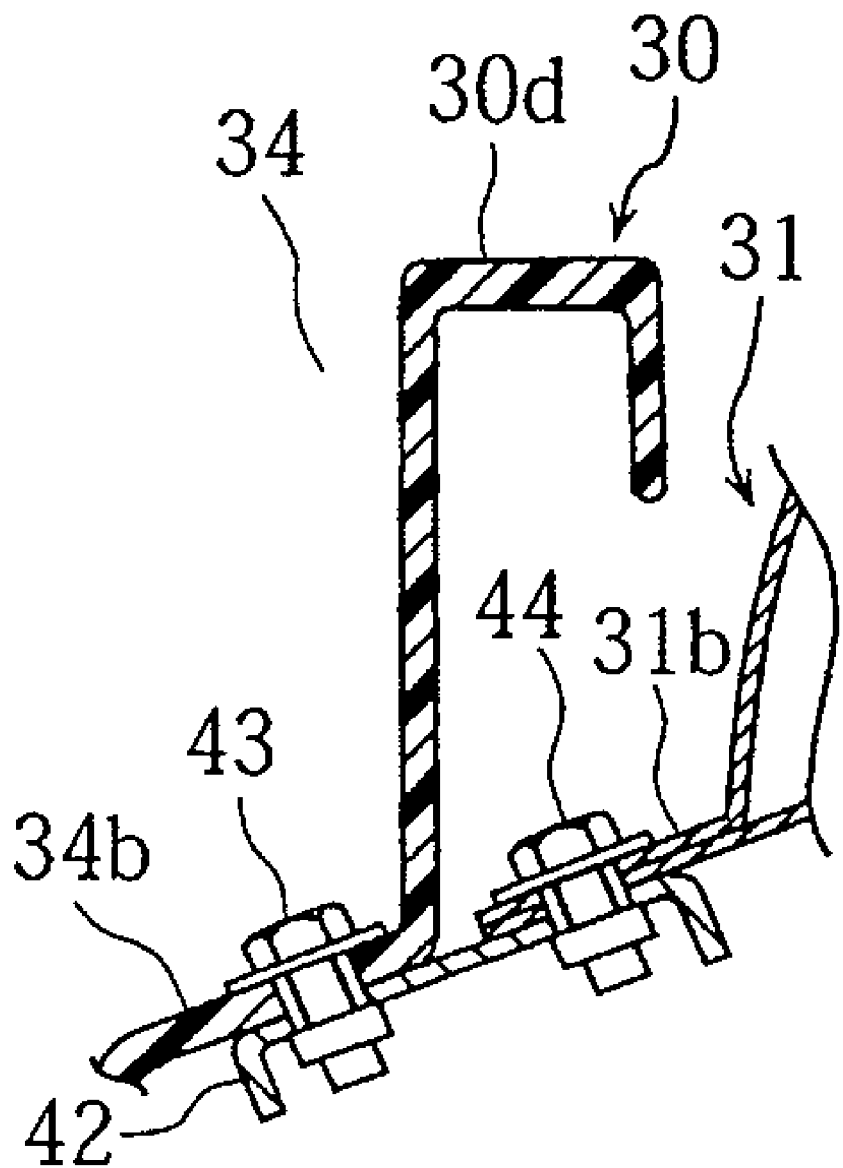
FIG. 5 is a side, cross-sectional view of a portion of the storage box taken along a line V-V in FIG. 4.
Figure 6:
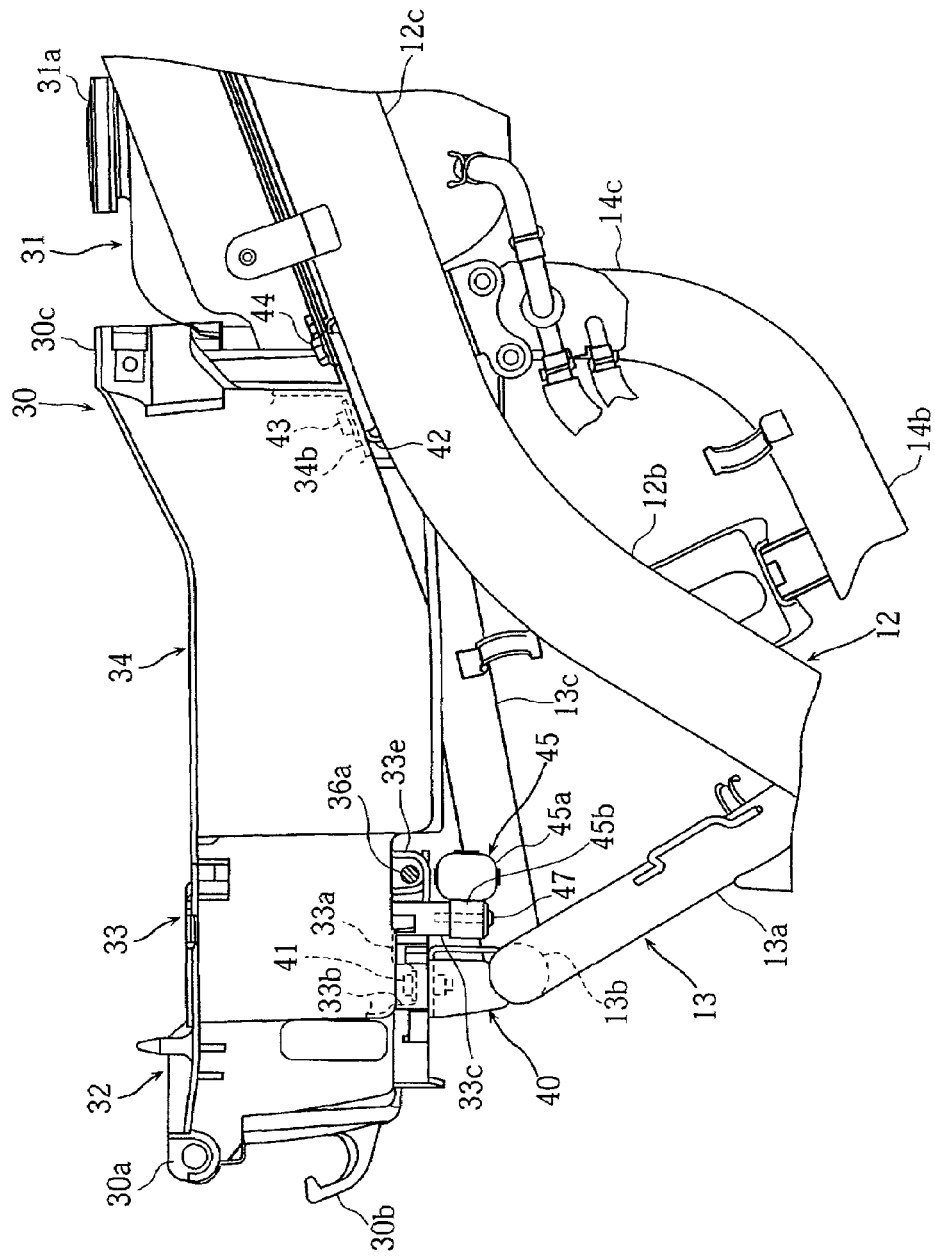
FIG. 6 is another side view of the storage box of FIG. 3, showing an inclination sensor of the motorcycle.
Figure 7:
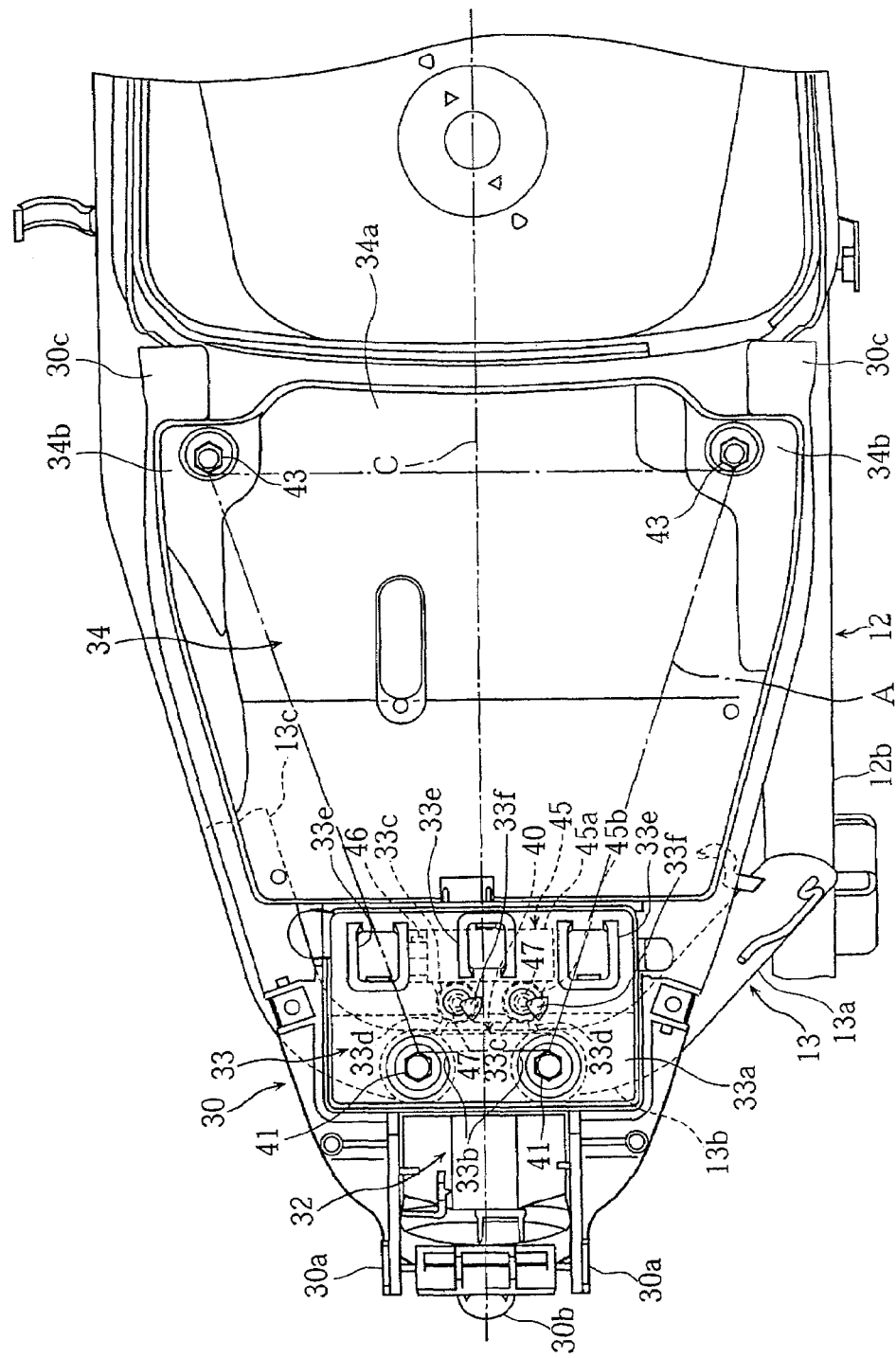
FIG. 7 is another plan view of the storage box of FIG. 3, showing a position of the inclination sensor relative to the storage box.
Figure 8:
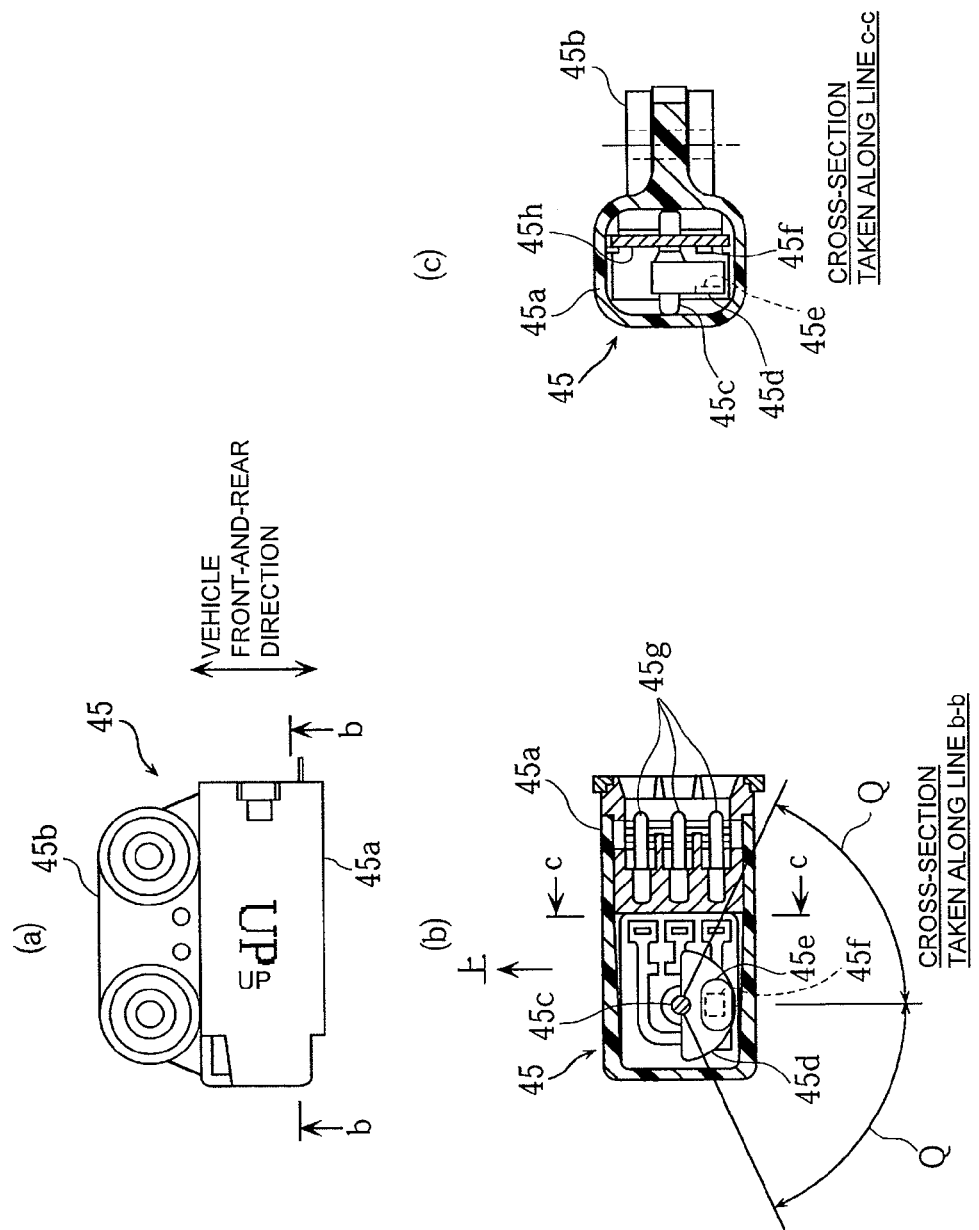
FIGS. 8a through 8c illustrate the inclination sensor of FIGS. 6 and 7 apart from the motorcycle.

FIGS. 1 through 8 illustrate a motorcycle having certain features, aspects and advantages of the present invention. In the illustrated motorcycle, the front-and-rear (or longitudinal) direction and the left-and-right (or lateral) direction refer to the front-and-rear direction and the left-and-right direction as viewed by a person sitting on a seat. Relative heights are expressed as elevations from a surface upon which the motorcycle sits in an upright position.

In the figures, reference numeral 1 denote a scooter-type motorcycle, which includes a step-through type body frame 2, which is generally U-shaped from the side view and provides a generally open space in front of the seat. However, the term motorcycle is used broadly herein to describe a wide variety of vehicles, which may include two longitudinally spaced wheels, and which preferably exhibits significant body roll during cornering. A head pipe 3 is disposed at the front end of the body frame 2 and a front fork 4 is supported by the head pipe 3 such that the front fork 4 can be steered to the left and right. A swing-type engine unit 5 is disposed in the central area of the body frame 2 and supported such that the engine unit 5 can swing upward and downward relative to the frame 2. A saddle-type tandem seat 6 provided on the upper part of the body frame 2. The above-described components (if present in any particular embodiment) constitute the vehicle body.

A front wheel 7 is supported at the lower end of the front fork 4. A steering handlebar 8 is fixed at the upper end of the front fork 4. A rear wheel 9 is supported at the rear end of the engine unit 5. A rear shock absorber 10 is disposed between the engine unit 5 and the body frame 2.

The body frame 2 includes the head pipe 3, a main pipe 11 extending downward from the head pipe 3 to the rear, left and right side pipes 12, 14 which are asymmetrical in the left-and-right direction and extend from the lower end of the main pipe 11 to the rear while expanding to the left and right, and a cross pipe 13 for connecting the left and right side pipes 12, 14.

The left side pipe 12 has a footrest portion 12a extending substantially horizontally from the lower end of the main pipe 11 to the rear, a rising portion 12b extending diagonally upward from the footrest portion 12a, and a rail portion 12c extending diagonally upward from the rising portion 12b.

The right side pipe 14 has a footrest portion 14a extending substantially in parallel with the footrest portion 12a, an inclined portion 14b extending diagonally upward from the footrest portion 14a, and a vertical portion 14c extending upward from the rear end of the inclined portion 14b. The inclination angle of the inclined portion 14b is set smaller than the rising angle of the rising portion 12b as viewed from the side of the vehicle. The vertical portion 14c is disposed behind the rising portion 12b.

The cross pipe 13 has a standing portion 13a extending diagonally upward from the rising portion 12b of the left side pipe 12 to the front, a cross portion 13b extending from the upper end of the standing portion 13a while bending to the right in the vehicle width direction, and a rail portion 13c (FIG. 3) bending rearward from the right end of the cross portion 13b and extending diagonally upward. The upper end of the vertical portion 14c of the right side pipe 14 is connected to the intermediate part of the rail portion 13c in the front-and-rear direction. The rail portion 13c is positioned substantially at the same level as the position of the rail portion 12c of the left side pipe 12, and extends in parallel with the rail portion 12c. Although such a frame 2 is desired, other suitable frame structures may be used as well, such as a composite frame construction and/or a frame construction having fewer frame components.

The front regions of the head pipe 3 and main pipe 11 of the body frame 2 are covered by a front cover 15, and the rear regions thereof are covered by a leg shield 16. The body frame 2 in the vicinity of the lower peripheral region of the seat 6 is covered by left and right side covers 17, 17. The lower surfaces of the left and right side covers 17, 17 are covered by a rear fender 18 disposed in such a position as to be positioned above the upper region of the rear wheel 9.

The upper regions of the left and right footrest portions 12a and 14a of the body frame 2 are covered by a footboard 19, and the lower regions thereof are covered by a bottom cover 20.

The periphery of the steering handlebar 8 is covered by a handle cover 21. The handle cover 21 has an instrument unit 25 which preferably contains a speed meter, a fuel level meter, and possibly other instruments. A head light unit 26 is provided on the front cover 15. A tail light unit 27 is equipped at the rear ends of the left and right side covers 17, 17.

A storage box 30 is an example of a component removably mounted to the vehicle 1. Preferably, the storage box 30 is made of resin-containing material, or composite. A fuel tank 31 is also an example of a component removably mounted to the vehicle 1 and preferably is made of sheet metal. The storage box 30 and the fuel tank 31 are disposed below the seat 6 in parallel with each other in the front-and-rear direction. The fuel tank 31 is mounted between the left and right rail portions 12c and 13c such that the upper half of the fuel tank 31 projects upward. The fuel tank 31 is attachable and detachable to and from the body frame 2, preferably by the use of a tool. However, some arrangements may permit removal without a tool. A fuel cap 31a permits opening and closing of a fuel refill port of the fuel tank 31.

The storage box 30 is mounted on the cross pipe 13, and is attachable and detachable to and from the body frame 2, preferably by the use of a tool. However, some arrangements may permit removal without a tool.

The storage box 30 has a substantially trapezoidal shape whose width decreases from the rear toward the front in the plan view. A hinge 30a is provided at the front wall of the storage box 30 to support the front end of the seat 6 via a hinge pin 29 such that the front end of the seat 6 can rotate. A pair of left and right seat supports, or receivers 30c, 30c, are provided at the rear end of the storage box 30. The load of the seat is supported by the hinge 30a and the left and right seat receivers 30c, 30c, which may be collectively referred to as seat support portions. Thus, the hinge 30a and the seat receivers 30c constitute a load receiving unit for the seat 6. The storage box 30 has a hook 30b for carrying luggage.

The seat 6 is locked to the body frame 2 by a locking unit (not shown). The locked condition by the locking unit is released by operation of a key. Thus, preferably, the seat 6 can be opened and closed without using a tool or the like.

The storage box 30 and the fuel tank 31 are disposed below the seat 6, and therefore the seat 6 is opened or closed every time the article in the storage box 30 is taken in and out and every time fuel is supplied to the fuel tank 31. Thus, the seat 6 is frequently opened and closed.

The storage box 30 is divided into a fuse storage area 32 for accommodating electric equipment 35 such as a starter relay, a battery storage area (or battery supporting area) 33 for accommodating a battery (which is an example of a heavy item of the vehicle) 36, and a main storage area 34 in this order from the front. Helmet holders 37, 37 are fastened to the upper edge of the battery storage area 33.

A pair of left and right front attachment portions 33b, 33b are defined by downward-projecting recesses formed at the front end of a bottom wall 33a of the battery storage area 33. A pair of left and right rear attachment portions 34b, 34b are formed at the rear end of a bottom wall 34a of the main storage area 34. In the illustrated arrangement, the attachment portions 34b, 34b are not recessed, but may be bosses that are slightly elevated from a surrounding surfaces of the box 30.

The left and right front attachment portions 33b, 33b are fixed by fasteners, such as bolts 41, 41, which are inserted from above into a gate-shaped front bracket 40 connected with the upper surface of the cross portion 13b of the cross pipe 13.

The left and right rear attachment portions 34b, 34b are fixed by fasteners, such as bolts 43, 43, which are inserted from above into a rear bracket 42 bridged and connected between the left and right rail portions 12c, 13c. The storage box 30 can be detached from the body frame 2 when the four bolts 41 and 43 are removed by using a tool. In other arrangements, the bolts 41 and 43 may be configured for removal without a tool.

A front flange 31b of the fuel tank 31 is fixed to the rear bracket 42 by fasteners, such as left and right bolts 44, 44. The upper parts of the left and right bolts 44, 44 are covered by a rear edge 30d of the storage box 30. The fuel tank 31 is detachable by removing the storage box 30.

An inclination sensor 45 is disposed below the storage box 30. The inclination sensor 45 is positioned on an approximate body center line C (FIG. 7), and is removably attached to the bottom surface of the storage box 30.

The inclination sensor 45 has a structure formed with an attachment member 45b which projects frontward with respect to the vehicle from a cylindrical sensor case 45a having a bottom and extending laterally, or in the vehicle width direction. A pendulum 45d is provided within the sensor case 45a such that the pendulum 45d can freely swing to the left and right around a swing axis 45c. A magnetic sensor 45f is equipped within the sensor case 45a in such a position as to be opposed to a plastic magnet 45e of the pendulum 45d at its rest position. A circuit board 45h having a plurality of output pins 45g is connected with the magnetic sensor 45f. An ECU (not-shown) is connected with the respective output pins 45g via a connector 46.

When the vehicle body is inclined, the pendulum 45d swings with the vehicle body in a direction away from the magnetic sensor 45f. When an inclination angle θ of the pendulum 45d reaches a predetermined value of 65 degrees, for example, the magnetic sensor 45f comes into a non-detection state. When the non-detection state continues for a predetermined period, the ECU stops fuel supply to the engine 5.

The inclination sensor 45 is attached to the lower surface of the battery storage area 33. Preferably, a pair of left and right bosses 33c, 33c project in a downward direction from the lower surface of the bottom wall 33a of the battery storage area 33 behind the left and right attachment portions 33b, 33b. The left and right bosses 33c, 33c are positioned inside the left and right attachment portions 33b, 33b in the vehicle width direction, and are connected with the left and right attachment portions 33b, 33b via reinforcement ribs 33d, 33d.

A plurality of clamp members 33e, through which a battery cable 36a is inserted to be supported thereby, are disposed behind the bosses 33c, 33c of the bottom wall 33a in parallel with each other in the vehicle width direction. A drip hole 33f is provided on each base of the bosses 33c, 33c of the bottom wall 33a.

The attachment portion or member 45b of the inclination sensor 45 is fixed to the left and right bosses 33c by a pair of fasteners, such as left and right bolts 47, 47, inserted from below such that the inclination sensor 45 can be removed.

The inclination sensor 45 is positioned behind and in the vicinity of the front bracket 40 in the plan view, and located within an area A bounded by the four front and rear bolts 41 and 43 for fixing the storage box 30. More specifically, the width of the area A bounded by the bolts 41, 43 in the vehicle width direction decreases from the rear of the vehicle body to the front, and the inclination sensor 45 is positioned in the front region of the area A with respect to the vehicle body and, preferably, within the front half of the area A. In this embodiment, the front region of the area A refers to the front side located before the intermediate position between the forefront bolts 41 and the rearmost bolts 43 in the front-and-rear direction of the vehicle body. Thus, the front part of the inclination sensor 45 is covered by the cross portion 13b of the cross pipe 13 and the front bracket 40, and the right side of the inclination sensor 45 is covered by the rail portion 13c.

The hinge 30a and the seat receivers 30c, which function as load receivers for the seat 6, are located outside of the area A bounded by the bolts 41 and 43.

In such an arrangement, the inclination sensor 45 is disposed below the storage box 30, which can be removed by removing the four bolts 41 and 43 by the use of a tool. Thus, the inclination sensor 45 is protected by the storage box 30, which is not removed in the normal condition, and therefore the position of the inclination sensor 45 is not shifted by an external force. Accordingly, the detection accuracy of the inclination sensor 45 can be maintained.

Since the inclination sensor 45 is attached to the bottom surface of the storage box 30, which supports the seat 6 such that the seat 6 can be opened and closed, the inclination sensor 45 is supported by the storage box 30 which has high rigidity sufficient for supporting the weight of the rider. Thus, protection of the inclination sensor 45 from the external force is further enhanced.

In such an arrangement, the inclination sensor 45 is positioned within the area A surrounded by the four front and rear bolts 41 and 43 for fixing the storage box 30 to the body frame 2. Since the inclination sensor 45 is disposed in a portion having high attachment strength, shifting of the position of the inclination sensor 45 is securely prevented. There is a possibility that the inclination sensor 45, which is often positioned at the center in the width direction of the vehicle body, is not supported in a stable condition when the inclination sensor 45 is positioned in the rear region of the vehicle body where the clearance between the fasteners is large and, thus, the mounting surface less rigid. In the illustrated embodiment, however, the inclination sensor 45 is positioned in the front region where the clearance between the attachment members is small, rather than in the rearward region of the box 30, where the space between the fasteners 43 is larger. Accordingly, the inclination sensor 45 is located in the vicinity of the fasteners and thus is supported in a stable condition due to the increased rigidity offered by the close proximity of the attachment points.

Since the inclination sensor 45 is disposed behind and in the vicinity of the front bracket 40 which supports the storage box 30, the supporting strength of the inclination sensor 45 can be increased.

In the illustrated embodiment, the inclination sensor 45 is attached to the bottom surface of the battery storage area 33 of the storage box 30. Thus, the inclination sensor 45 can be supported by the battery storage area 33, which is configured to have a relatively high strength and rigidity for supporting the battery 36 as a heavy vehicle item or component that needs to be supported.

Since the hinge 30a and the seat receivers 30c for supporting the seat 6 are disposed outside of the area A where the inclination sensor 45 is positioned, the space for disposing the inclination sensor 45 is not narrowed even if the hinge 30a and other components are bended by a load from the seat 6. Accordingly, the inclination sensor 45 does not interfere with the peripheral components.

In the illustrated embodiment, the bosses 33c are formed on the bottom wall 33a of the battery storage area 33, and the inclination sensor 45 is attached to the bosses 33c. However, the invention is not limited to such a construction.

Figure 9:
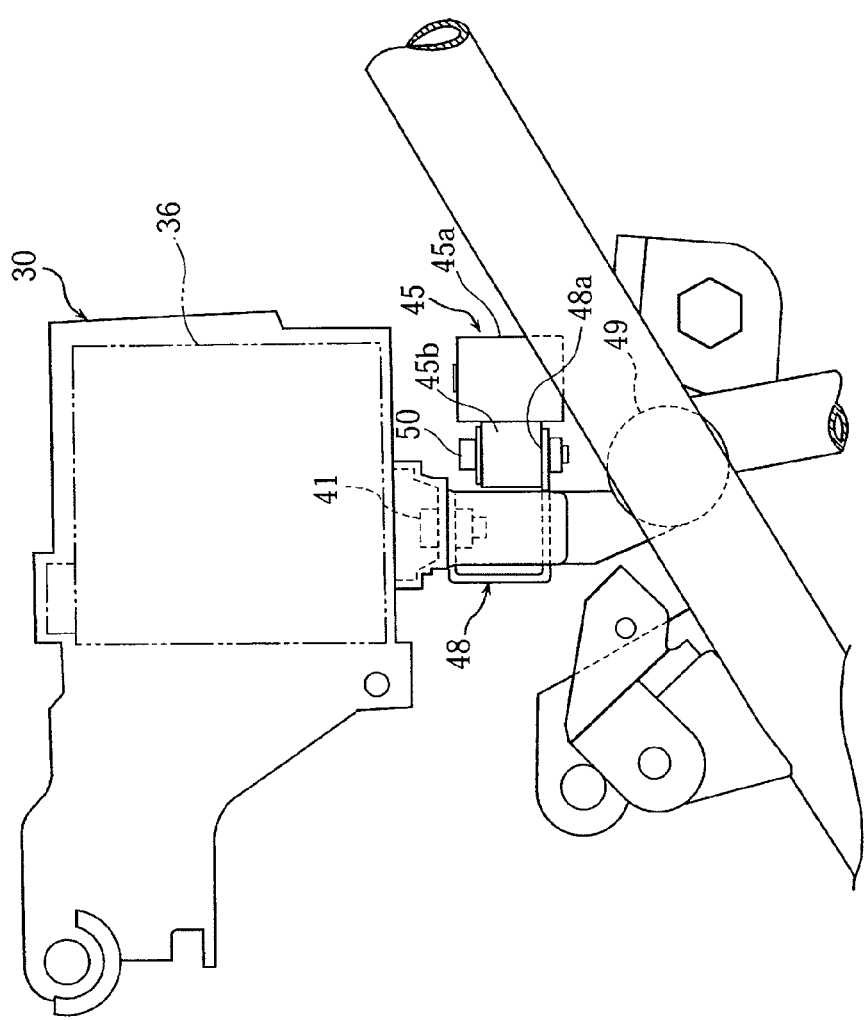
FIG. 9 is a side view of a modification of the inclination sensor mounting arrangement of FIGS. 1 through 8.

FIG. 9 shows another embodiment having certain features, aspects and advantages of the invention. In this figure, similar numbers are given to parts and components similar or corresponding to those shown in FIG. 6.

In the embodiment illustrated in FIG. 9, the inclination sensor 45 is attached to a bracket 48 for supporting the storage box 30, which also accommodates the battery 36. The bracket 48 is connected with a cross pipe 49 extending in the vehicle width direction. The storage box 30 is removably attached to the bracket 48 by the bolts 41. An attachment piece 48a projecting to the rear is formed on the bracket 48, and the attachment member 45b of the inclination sensor 45 is fixed to the attachment piece 48a by a bolt 50.

In this embodiment, the inclination sensor 45 is directly attached to the bracket 48, which supports the storage box 30. Thus, the storage box 30 protects the inclination sensor 45 from the external force, and therefore the strength for supporting the inclination sensor 45 increases.

In the above embodiments, the storage box is used as the component removably mounted on the vehicle. However, other components such as air cleaner and fuel tank which are attachable and detachable by the use of a tool may be used as the component mounted on the vehicle. The removably mounted component does not include the seat or a dedicated component for covering the inclination sensor, such as a cover. That is, the removably mounted component is a functional component of the vehicle that performs a function in addition to covering the inclination sensor. In addition, the component removably mounted on the vehicle may be components which can be attached and detached without using a tool, such as a component attached to the vehicle by a thumbscrew.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present inclination sensor mounting arrangement of the present motorcycle has been described in the context of particularly preferred embodiments, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A motorcycle, comprising a body including a seat, the motorcycle further comprising an inclination sensor for detecting a lateral inclination angle of the body, wherein the inclination sensor is positioned below a storage box which is removably mounted on the body of the motorcycle by a plurality of fasteners, wherein the storage box is located below the seat and defines a storage compartment, wherein the inclination sensor is located within an area bounded by the fasteners and the inclination sensor is attached to a bottom surface of the storage box outside of the storage compartment.

2. The motorcycle of claim 1, wherein a width of the area bounded by the fasteners decreases in a direction from the rear toward the front of the vehicle body, and the inclination sensor is located substantially within the forward half of the area.

3. The motorcycle of claim 1, wherein the storage box includes support portions for supporting a load applied to the component by the seat.

4. The motorcycle of claim 3, wherein the support portions are located outside of the area bounded by the fasteners.

5. The motorcycle of claim 1, wherein the storage box supports a relatively heavy item that forms a part of the motorcycle, the inclination sensor being disposed below the space in which the item is supported.

6. The motorcycle of claim 5, wherein the item is a battery.

7. The motorcycle of claim 1, wherein the storage box includes a portion adapted to support a battery, the inclination sensor being positioned below the battery supporting portion of the storage box.

8. The motorcycle of claim 7, wherein the inclination sensor is positioned so as to be substantially intersected by a longitudinal, vertical center plane of the body.

9. A motorcycle, comprising;
a body; and
an inclination sensor for detecting a lateral inclination angle of the body;
wherein the inclination sensor is positioned below a component of the motorcycle and wherein the component is one of a storage box, an air cleaner box and a fuel tank, wherein the inclination sensor is attached to a bottom surface of the component, the component is mounted to the motorcycle by a plurality of fasteners and the inclination sensor is located within an area bounded by the fasteners.

10. The motorcycle of claim 9, wherein a width of the area bounded by the fasteners decreases in a direction from the rear toward the front of the motorcycle, and the inclination sensor is located substantially within the forward half of the area.

11. The motorcycle of claim 9, wherein the component includes support portions for supporting a load applied to the component by a seat of the motorcycle.

12. The motorcycle of claim 11, wherein the support portions are located outside of the area bounded by the fasteners.

13. The motorcycle of claim 9, wherein the motorcycle has a step-through configuration in which the body is generally U-shaped from a side view and defines a generally open space between a seat and a handlebar of the motorcycle.

14. A motorcycle, comprising;
a body; and
an inclination sensor for detecting a lateral inclination angle of the body;
wherein the inclination sensor is positioned below a component of the motorcycle and wherein the component is one of a storage box, an air cleaner box and a fuel tank, wherein the inclination sensor is attached to a bracket and the component is also attached to the bracket, wherein the component is mounted to the motorcycle by a plurality of fasteners and the inclination sensor is located within an area bounded by the fasteners.

15. The motorcycle of claim 14, wherein a width of the area bounded by the fasteners decreases in a direction from the rear toward the front of the motorcycle, and the inclination sensor is located substantially within the forward half of the area.

16. The motorcycle of claim 14, wherein the component includes support portions for supporting a load applied to the component by a seat of the motorcycle.

17. The motorcycle of claim 16, wherein the support portions are located outside of the area bounded by the fasteners.

18. The motorcycle of claim 14, wherein the motorcycle has a step-through configuration in which the body is generally U-shaped from a side view and defines a generally open space between a seat and a handlebar of the motorcycle.

* * * * *